Patented May 28, 1946

2,400,957

UNITED STATES PATENT OFFICE 2,400,957

MANUFACTURE OF POLYVINYL ACETAL RESINS

Gelu Stoeff Stamatoff, Rutherford, N. J., assignor to E. I. du Pont de Nemours & Company, Wilmington, Del., a corporation of Delaware No Drawing. Application July 13, 1943,
Serial No. 494,511

10 Claims. (Cl. 260—73)

This invention relates to the manufacture of polyvinyl acetal resins and, more particularly, to a procedure for preparing polyvinyl butyral resin on a commercial scale.

A process for the production of polyvinyl acetal resins in finely divided form is disclosed in applicant's copending application Serial No. 479,055 filed March 13, 1943. The process there disclosed involves the simultaneous and proportionate admixture and condensation in the presence of an acid catalyst of polyvinyl alcohol in a preponderantly aqueous solution with an aldehyde containing at least 2 carbon atoms in the proportion of at least 0.05 mol of aldehyde per 1.0 mol of polyvinyl alcohol. It has now been found that when this process is employed commercially, a completely satisfactory production is not always obtained. This arises from the fact that the use of industrial equipment limits the agitation and ingredient addition rates that may be feasibly obtained during the execution of this process. Thus, ingredient addition times substantially less than 10 minutes may be prohibited by such items as pump capacities for the solution viscosities involved. Furthermore, for the efficient utilization of production equipment, ingredient addition times substantially in excess of 60 minutes are impractical. If the aforementioned process be employed and the time limits of ingredients addition which may be practically obtained generally in commercial equipment, be applied thereto, it will be found that a substantial proportion of the product may be isolated from the reaction mixture in a form too fine for efficient handling in commercial centrifuges and dryers. Furthermore, the products produced thereby will not possess the optimum desirable degree of homogeneity with respect to extent of condensation.

It is an object of this invention to provide certain features in the production of polyvinyl acetal resins by the condensation of an aldehyde with polyvinyl alcohol in an aqueous or preponderantly aqueous medium which will ensure uniform condensation and substantially homogeneous products with respect to degree of acetalization. A further object is the provision of a method whereby polyvinyl acetal resins possessing a particle size and shape completely suitable for efficient handling on a commercial scale may be produced with a minimum of operational difficulties. Other objects will be apparent from the description of the invention given hereinafter.

The above objects are accomplished according to the present invention wherein a polyvinyl acetal resin is prepared by the condensation reaction of an aldehyde containing at least two carbon atoms with polyvinyl alcohol in a preponderantly water solution, by adding the aldehyde gradually with agitation in the presence of an acid catalyst to a quantity of the polyvinyl alcohol solution representing approximately 10%-60% of the total polyvinyl alcohol to be reacted, and commencing to add the remainder of the polyvinyl alcohol solution to the reaction mixture before any incipient precipitation of aldehyde-polyvinyl alcohol condensation product takes place, the aldehyde being added at such rate that at least 0.05 mol of aldehyde to 1 mol of polyvinyl alcohol has been added to the reaction mixture by the time the addition of the polyvinyl alcohol solution is complete; thereafter, the reaction is allowed to proceed until the desired homogeneous polyvinyl acetal resin is precipitated in the form of granular particles.

In carrying out the process of this invention the remainder of the polyvinyl alcohol solution and the aldehyde are normally added simultaneously to the polyvinyl alcohol solution initially placed in the reaction vessel and it is preferred that these ingredients be added gradually and more or less uniformly in such relative proportions that the required minimum of aldehyde has been added by the time the addition of polyvinyl alcohol solution has been completed; any further aldehyde may be added thereafter but the addition of all the ingredients should be completed in 5 to 60 minutes as a matter of practical operation.

Although the addition of the polyvinyl alcohol solution to the reaction mixture must be commenced before any permanent incipient precipitation of aldehyde-polyvinyl alcohol condensation product takes place this does not exclude from the invention the addition of aldehyde and allowing some precipitation to take place but redissolving the precipitated condensation product, by adjustment of temperature or otherwise, before adding the polyvinyl alcohol solution. In other words, there must not be even any incipient precipitation of condensation product at the time the addition of polyvinyl alcohol is commenced although it is not critical whether some precipitation and redissolving of the precipitate has occurred or not.

The following examples wherein all proportions are by weight unless otherwise stated, illustrate specific embodiments of the invention:

*Example I*

A solution of 1,000 parts of polyvinyl alcohol carrying residues of 800 parts of methanol and 3.0 parts of acid as methyl sulfuric acid in 8200 parts of water, is prepared by mixing the indicated ingredients at an elevated temperature for a sufficient length of time to produce a completely homogeneous solution. The acidity of the resulting solution is adjusted to .01%-.015% calculated as methyl sulfuric acid, when tritrated with sodium hydroxide using methyl orange indicator. 3,000 parts of this solution are charged into a condensation kettle equipped with an efficient agitator. Agitation of the solution is initiated and 800 parts of butyraldehyde and the remainder of the polyvinyl alcohol solution are added thereto simultaneously and at proportional rates so that at the end of 20 minutes the total quantity of these materials has been added to the kettle during which time the reaction mixture is maintained at 70° C. At the conclusion of this ingredient addition, 6,000 parts of hot water, 60° C.-70° C., are added over a period of 15 to 20 minutes through a sparger into the condensation mixture. At the conclusion of the addition of the hot water, the temperature of the reaction mixture is found to be 69° C.

The reaction mixture is allowed to agitate and react for 10 minutes at which time 3 parts of concentrated sulfuric acid dissolved in a small amount of water are added. The reaction mixture is then allowed to react for 50 minutes further. At the conclusion of the 60 minutes' total condensation time, the resin is washed for 30 minutes and then stabilized and isolated in known fashion.

The isolated resin is very homogeneous with respect to the extent of degree of condensation; the hydroxyl content of the resin as calculated as polyvinyl alcohol, lies between an extreme limit of 12% and 13%. Furthermore, the particles produced by this procedure are of such size and shape as to permit very efficient handling in the subsequent steps of stabilization and drying.

*Example II*

10,000 parts of polyvinyl alcohol solution are prepared as in Example I. The acidity of the solution is adjusted to .04% when calculated as methyl sulfuric acid. 3,000 parts of the polyvinyl alcohol solution are charged into a condensation kettle and 300 parts of butyraldehyde are added to the vigorously agitated solution together with the remainder of the polyvinyl alcohol solution. The addition of butyraldehyde and polyvinyl alcohol solution is carried out simultaneously and is so proportioned that at the end of 18 minutes the total quantity of these materials has been added to the kettle. 300 more parts of butyraldehyde are then added over a period of about 5 minutes. The reaction mixture is then agitated for 10 minutes during which time 6,000 parts of hot water are added through a sparger. 3 parts of a concentrated sulfuric acid diluted with a small quantity of water are then added to the mixture which is permitted to agitate and react further for 65 minutes. At the conclusion of the 75 minutes' total condensation time, the resin is washed, stabilized, isolated and dried in known fashion.

The resin thus obtained is very homogeneous with respect to extent of condensation and the particles of resin are of such size and shape as to permit very efficient handling in the subsequent steps of stabilization and drying.

The above example illustrates the addition of only one-half of the quantity of aldehyde necessary for the complete reaction to the desired degree of acetalization of the polyvinyl alcohol before the addition of polyvinyl alcohol solution is completed. When forming resins possessing a hydroxyl content more than 15%, when calculated as polyvinyl alcohol, it is preferred to limit the amount of aldehyde added prior to the completion of the addition of the polyvinyl alcohol to one-half or less of the total amount of aldehyde to be reacted. At least sufficient aldehyde must be added, however, in the production of such resins to insure a ratio of aldehyde to polyvinyl alcohol of 0.05 mol to 1.0 mol, respectively.

*Example III*

A solution of polyvinyl alcohol is made up similar to the procedure outlined in Example I, except in this case acidity is adjusted to .01% when calculated as methyl sulfuric acid. 600 parts of this solution are charged into a reaction kettle and the temperature is adjusted to 65° C. 400 parts more of the same polyvinyl alcohol solution and 8.2 parts of butyraldehyde at a temperature of 30° C. are added proportionately and simultaneously over a period of 20 minutes to the agitated contents of the kettle maintained at a temperature of 65° C. Within 5 minutes, 53.8 parts more of butyraldehyde are admixed with the reaction mixture. The mixture is then allowed to agitate and react for a total of 60 minutes more, while maintained at a temperature of 65° C. The precipitated resin is then washed, stabilized and isolated in known fashion.

The resin is found to possess a highly satisfactory degree of homogeneity with respect to extent of condensation. The particle size, although completely satisfactory for handling on a commercial scale, is not as desirable as that particle size produced by the procedures of both Examples I and II.

*Example IV*

1000 parts of polyvinyl alcohol solution are prepared as indicated in Example I above. The acidity of the solution is adjusted to 1.5% when calculated as methyl sulfuric acid. 100 parts of this solution are charged into a reaction kettle and the temperature is adjusted to 30° C. The remainder of the polyvinyl alcohol solution at a temperature of 30° C. and 30 parts of butyraldehyde at the same temperature are added proportionately and simultaneously over a period of 20 minutes. These ingredients are allowed to react for 5 minutes at which time 30 parts more of butyraldehyde at 30° C. are added quickly to the reaction mixture. While agitating vigorously, the admixed ingredients are allowed to react for a total of 60 minutes more. The precipitated polyvinyl acetal resin thus produced is then washed, stabilized and isolated in known fashion.

The produced resin is found to possess a very satisfactory degree of homogeneity with respect to extent of acetalization. The size and shape of the resin particles, although completely satisfactory with regard to commercial handling, are not as desirable as those produced by the procedures outlined in Examples I and II.

*Example V*

600 parts of an aqueous polyvinyl alcohol solution containing 60 parts of polyvinyl alcohol and 40 parts of incidental methanol, and possessing an acidity of 0.01% when calculated as methyl sulfuric acid, based on the weight of the total solution, are charged into a suitable reaction vessel. 8.2 parts of butyraldehyde are added to the vigorously agitated contents of the vessel which are maintained at a temperature of about 65° C. These ingredients are allowed to react at this temperature for 30 minutes during which time the vigorous agitation is continued. At the end of this time a gummy mass has separated from the reaction mixture but the temperature of the reaction mixture is then reduced to 30° C. at which point the precipitate is found to have redissolved. 400 parts further of the polyvinyl alcohol solution and 52 parts of butyraldehyde are then added isothermally, simultaneously, and proportionately at a uniform rate to this agitated solution over a period of 20 minutes. The reactants are then allowed to react further for 60 minutes at 30° C. The reaction mixture is then heated to 80° C. and allowed to remain at this temperature until the condensation is complete. The precipitated polyvinyl butyral resin is then washed and isolated in known fashion.

The isolated resin is found to possess good homogeneity with regard to degree of acetalization and the particle size is completely satisfactory for commercial handling.

Carrying out Example V without substantial change except that the temperature is not lowered after the precipitation of the gummy mass and, hence, the polyvinyl alcohol solution and further butyraldehyde is added while the gummy mass is present in the reaction mixture, a product was obtained in the form of large, hard balls of resin which are entirely unsatisfactory for handling in a commercial stabilization or drying process.

Where the addition of aldehyde to the reaction mixture is made prior to the further addition of the remainder of the polyvinyl alcohol solution, as illustrated in the above example, it is preferred that, once the addition of the polyvinyl alcohol solution be commenced, it should be continued at a substantially uniform rate. This uniform addition of added polyvinyl alcohol insures the optimum production of satisfactory particle size and homogeneity. The addition of aldehyde made simultaneously with the addition of polyvinyl alcohol solution should be proportionate. Moreover, for optimum production of satisfactory particle size and homogeneity, it is preferred to limit the amount of aldehyde present in the reaction mixture prior to the addition of the further polyvinyl alcohol solution, to not more than 50% of the total aldehyde to be reacted.

*Example VI*

The procedure of Example V is followed except the initial mixture of 8.2 parts of butyraldehyde and 600 parts of polyvinyl alcohol solution is allowed to react for only 5 minutes before the stream-wise addition of further polyvinyl alcohol solution and butyraldehyde is initiated. Thus, this stream-wise addition is begun a short time before incipient precipitation of any condensation product ensues.

A polyvinyl acetal resin is isolated and found to possess a good degree of homogeneity with regard to extent of acetalization and the particle size of the resin is completely satisfactory for commercial handling.

It will be understood that the above Examples are merely illustrative and the process may be varied considerably without departing from the scope of this invention. It has been found that by preparing polyvinyl acetal resins according to the present invention, the particles of resin produced are of porous structure but, nevertheless, they are not easily disintegrated and their porous nature facilitates efficient drying of the same.

The particle size of the products obtained in any precipitation process is dependent to some extent on the degree of agitation present in the dispersing medium at the time of precipitation. However, for all degrees of agitation which would serve satisfactorily to mix the reactants in the present process carried out on a commercial scale sufficiently to obtain a homogeneous product, the effect of any variations in agitation is very small in comparison with the effect of the factors of this invention with respect to particle size of the resin. Thus, the more rapid the agitation, the more homogeneous will be the final product but, by the same token, the finer will be the particle size. Therefore, since the speed of agitation is practically limited by product homogeneity and other factors, it is not possible on a commercial scale to regulate particle size of the resin solely by agitation without recourse to the features of the present invention.

The temperature of the reaction mixture during the period of ingredient addition may conveniently be between the limits of 25° C.–75° C., preferably between the limits of 55° C.–65° C., and the temperature prevailing at the start of the admixing should be maintained preferably at approximately that temperature until the admixture of reactants has been completed. After completion of the admixture of reactants, the temperature of the reaction mixture may be varied from 30° C. to 100° C. All other things being equal, particle size is inversely proportional to the reaction temperature prevailing at the time of the admixture of the reaction ingredients. Within the limits of the temperature mentioned above, the particle size of the resin will be satisfactory provided the features of the present invention are observed.

Again, all other things being equal, particle size is inversely proportional to the catalyst concentration prevailing at the time of admixture of reaction ingredients. However, between the practical limits of catalyst concentration which may be employed in carrying out the present invention, such limits being 0.005% to 2.0%, by weight of polyvinyl alcohol, when calculated as methyl sulfuric acid, and, preferably, between 0.01% and 0.1%, said particle size will result provided the features of the present invention are observed.

As the catalyst for effecting the desired reaction of condensation, sulfuric acid is entirely satisfactory but other mineral acids may be used, such as hydrochloric and phosphoric acid, or organic acids such as benzene sulfonic and ethyl sulfonic acids, or formic acid, or other recognized catalysts of acidic character such as zinc chloride and calcium chloride. It is also satisfactory to use the acid which remains with the polyvinyl alcohol as a residue of the acid used in its production from polyvinyl acetate. If the polyvinyl alcohol has been prepared by hydrolysis with the assistance of an acid, the residues of acid remaining in the polyvinyl alcohol are titrated as methyl sulfuric acid and are counted as a part of the content of catalyst for the reaction of condensation.

All other things being equal, particle size is directly proportional to the polyvinyl alcohol solution concentration. However, satisfactory particle size of the resin will be obtained if the features of the present invention are employed where a practical concentration of polyvinyl alcohol for the present process is employed. The concentration of the polyvinyl alcohol solution preferably should be between 5% and 15% polyvinyl alcohol by weight.

Frequently it is convenient or economical to start with the polyvinyl alcohol wet with the organic solvent in which it has been prepared, e. g., methanol or acetic acid, or methyl acetate formed as a by-product of hydrolysis in methanol. The presence of such an organic solvent in an amount up to about 15% of the batch is not objectionable except when its tendency to cause agglomeration is supplemented by the use of high temperatures. Such an amount of organic solvent, of course, leaves the solution of polyvinyl alcohol still preponderantly a water solution.

The term "polyvinyl alcohol" has been used herein to denote one of the starting materials merely for the sake of simplicity. Actually, the "polyvinyl alcohol" is the product of hydrolysis of a polyvinyl ester, usually polyvinyl acetate and it is common to use the products of an incomplete, rather than of a complete, hydrolysis of the polyvinyl ester. Thus, the "polyvinyl alcohol" may contain, in its macromolecules, residues of unhydrolyzed vinyl acetate in amounts up to as much as 30% but more usually, at least if the resin is to be used in safety glass interlayers, in amounts of the order of 0.5% to 6.0%.

While the invention has been described more particularly with respect to the preparation of polyvinyl butyral resins, the invention is applicable to the reaction product of polyvinyl alcohol with aldehydes containing more than two carbon atoms. Thus, acetaldehyde and propionaldehyde as well as other aldehydes may be used in place of butyraldehyde.

An advantage of the present invention is that it provides a means of producing a more homogeneous polyvinyl acetal resin than could be obtained heretofore. A further advantage is that it provides a simple and economical process for producing polyvinyl acetal resins in a form well adapted for handling efficiently in the subsequent steps of washing, filtering, and drying, and the like.

As many apparently widely different embodiments of this invention may be made without departing from the spirit and scope thereof, it is to be understood that the invention is not limited to the specific embodiments thereof except as defined in the appended claims.

I claim:

1. Process of preparing a polyvinyl acetal resin by the condensation reaction of an aldehyde containing from 2 to 4 carbon atoms with polyvinyl alcohol containing up to 30% of unhydrolyzed polyvinyl ester in a preponderantly water solution, which process comprises adding said aldehyde gradually with agitation in the presence of an acid catalyst to a quantity of said polyvinyl alcohol solution representing 10%–60% of the total polyvinyl alcohol to be reacted, and commencing to add the remainder of said polyvinyl alcohol solution to the reaction mixture before any permanent incipient precipitation of aldehyde-polyvinyl alcohol condensation product takes place, the aldehyde being added at such rate that at least 0.05 mol of aldehyde to 1 mol of polyvinyl alcohol has been added to the reaction mixture by the time the addition of the polyvinyl alcohol solution is completed.

2. Process of preparing a polyvinyl acetal resin by the condensation reaction of an aldehyde containing from 2 to 4 carbon atoms with polyvinyl alcohol containing up to 30% of unhydrolyzed polyvinyl ester in a preponderantly water solution, which process comprises adding said aldehyde gradually with agitation in the presence of an acid catalyst to a quantity of said polyvinyl alcohol solution representing 10%–60% of the total polyvinyl alcohol to be reacted, and commencing to add the remainder of said polyvinyl alcohol solution to the reaction mixture before any permanent incipient precipitation of aldehyde-polyvinyl alcohol condensation product takes place, the aldehyde being added at such rate that at least 0.05 mol of aldehyde to 1 mol of polyvinyl alcohol has been added to the reaction mixture by the time the addition of the polyvinyl alcohol solution is completed, and all of said aldehyde and polyvinyl alcohol solution being added to the reaction mixture in a period of 5 to 60 minutes.

3. Process of preparing a polyvinyl acetal resin by the condensation reaction of an aldehyde containing from 2 to 4 carbon atoms with polyvinyl alcohol containing up to 30% of unhydrolyzed polyvinyl ester in a preponderantly water solution, which process comprises adding said aldehyde gradually with agitation in the presence of an acid catalyst to a quantity of said polyvinyl alcohol solution representing 10%–60% of the total polyvinyl alcohol to be reacted, and commencing to add the remainder of said polyvinyl alcohol solution to the reaction mixture before any permanent incipient precipitation of aldehyde-polyvinyl alcohol condensation product takes place, the aldehyde being added at such rate that at least 0.05 mol of aldehyde to 1 mol of polyvinyl alcohol has been added to the reaction mixture by the time the addition of the polyvinyl alcohol solution is completed, and all of said aldehyde and polyvinyl alcohol solution being added to the reaction mixture in a period of 5 to 60 minutes, and said reaction mixture being maintained substantially constant at a temperature between 25° C.–75° C. during the addition of said aldehyde and polyvinyl alcohol solution, and thereafter maintaining the reaction mixture under agitation and at a temperature of 30° C.–100° C. until the condensation reaction has proceeded to the desired end-point.

4. Process of preparing a polyvinyl acetal resin by the condensation reaction of an aldehyde containing from 2 to 4 carbon atoms with polyvinyl alcohol containing up to 30% of unhydrolyzed polyvinyl ester in a preponderantly water solution, which process comprises adding gradually with agitation in the presence of an acid catalyst to a quantity of said polyvinyl alcohol solution representing 10%–60% of the total polyvinyl alcohol to be reacted, said aldehyde and the remainder of said polyvinyl alcohol solution, the commencement of the addition of said aldehyde and polyvinyl alcohol solution being substantially at the same time and said addition being at a substantially uniform rate in such relative proportions that at least 0.05 mol of aldehyde has been added to the reaction mixture by the time the addition of the polyvinyl alcohol solution is completed, all of said aldehyde and polyvinyl alcohol solution being added to the reaction mixture in a period of 5 to 60 minutes, and said reaction mixture being maintained substantially constant at a temperature between 25° C.–75° C. during the addition of said aldehyde and polyvinyl alcohol solution, and thereafter maintaining the reaction mixture under agitation and at a temperature of 30° C.–100° C. until the condensation reaction has proceeded to the desired end-point.

5. Process of preparing a polyvinyl butyral resin by the condensation reaction of butyraldehyde with polyvinyl alcohol containing up to 30% of unhydrolyzed polyvinyl ester in a preponderantly water solution, which process comprises adding said butyraldehyde gradually with agitation in the presence of an acid catalyst to a quantity of said polyvinyl alcohol solution representing 10%–60% of the total polyvinyl alcohol to be reacted, and commencing to add the remainder of said polyvinyl alcohol solution to the reaction mixture before any permanent incipient precipitation of butyraldehyde-polyvinyl alcohol condensation product takes place, the butyraldehyde being added at such rate that at least 0.05 mol of butyraldehyde to 1 mol of polyvinyl alcohol has been added to the reaction mixture by the time the addition of the polyvinyl alcohol solution is completed.

6. Process of preparing a polyvinyl butyral resin by the condensation reaction of butyraldehyde with polyvinyl alcohol containing up to 30% of unhydrolyzed polyvinyl ester in a preponderantly water solution, which process comprises adding said butyraldehyde gradually with agitation in the presence of an acid catalyst to a quantity of said polyvinyl alcohol solution representing 10%–60% of the total polyvinyl alcohol to be reacted, and commencing to add the remainder of said polyvinyl alcohol solution to the reaction mixture before any permanent incipient precipitation of butyraldehyde-polyvinyl alcohol condensation product takes place, the butyraldehyde being added at such rate that at least 0.05 mol of butyraldehyde to 1 mol of polyvinyl alcohol has been added to the reaction mixture by the time the addition of the polyvinyl alcohol solution is completed, and all of said butyraldehyde and polyvinyl alcohol solution being added to the reaction mixture in a period of 5 to 60 minutes.

7. Process of preparing a polyvinyl butyral resin by the condensation reaction of butyraldehyde with polyvinyl alcohol, containing up to 30% of unhydrolyzed polyvinyl ester in a preponderantly water solution, which process comprises adding said butyraldehyde gradually with agitation in the presence of an acid catalyst to a quantity of said polyvinyl alcohol solution representing 10%–60% of the total polyvinyl alcohol to be reacted, and commencing to add the remainder of said polyvinyl alcohol solution to the reaction mixture before any permanent incipient precipitation of butyraldehyde-polyvinyl alcohol condensation product takes place, the butyraldehyde being added at such rate that at least 0.05 mol of butyraldehyde to 1 mol of polyvinyl alcohol has been added to the reaction mixture by the time the addition of the polyvinyl alcohol solution is completed, and all of said butyraldehyde and polyvinyl alcohol solution being added to the reaction mixture in a period of 5 to 60 minutes, and said reaction mixture being maintained substantially constant at a temperature between 25° C.–75° C. during the addition of said butyraldehyde and polyvinyl alcohol solution, and thereafter maintaining the reaction mixture under agitation and at a temperature of 30° C.–100° C. until the condensation reaction has proceeded to the desired end-point.

8. Process of preparing a polyvinyl butyral resin by the condensation reaction of butyraldehyde with polyvinyl alcohol containing up to 30% of unhydrolyzed polyvinyl ester in a preponderantly water solution, which process comprises adding gradually with agitation in the presence of an acid catalyst to a quantity of said polyvinyl alcohol solution representing 10%–60% of the total polyvinyl alcohol to be reacted, said butyraldehyde and the remainder of said polyvinyl alcohol solution, the commencement of the addition of said butyraldehyde and polyvinyl alcohol solution being substantially at the same time and said addition being at a substantially uniform rate in such relative proportions that at least 0.05 mol of butyraldehyde has been added to the reaction mixture by the time the addition of the polyvinyl alcohol solution is completed, all of said butyraldehyde and polyvinyl alcohol solution being added to the reaction mixture in a period of 5 to 60 minutes, and said reaction mixture being maintained substantially constant at a temperature between 25° C.–75° C. during the addition of said butyraldehyde and polyvinyl alcohol solution, and thereafter maintaining the reaction mixture under agitation and at a temperature of 30° C.–100° C. until the condensation reaction has proceeded to the desired end-point.

9. Process of preparing a polyvinyl butyral resin by the condensation reaction of butyraldehyde with polyvinyl alcohol containing up to 30% of unhydrolyzed polyvinyl ester in a preponderantly water solution, which process comprises adding said butyraldehyde gradually with agitation in the presence of an acid catalyst to a quantity of said polyvinyl alcohol solution representing 10%–60% of the total polyvinyl alcohol to be reacted, said polyvinyl alcohol solution being of 5%–15% polyvinyl alcohol concentration, and commencing to add the remainder of said polyvinyl alcohol solution to the reaction mixture before any permanent incipient precipitation of butyraldehyde-polyvinyl alcohol condensation product takes place, the butyraldehyde being added at such rate that at least 0.05 mol of butyraldehyde to 1 mol of polyvinyl alcohol has been added to the reaction mixture by the time the addition of the polyvinyl alcohol solution is completed, and all of said butyraldehyde and polyvinyl alcohol solution being added to the reaction mixture in a period of 5 to 60 minutes, and said reaction mixture being maintained substantially constant at a temperature between 55° C.–65° C. during the addition of said butyraldehyde and polyvinyl alcohol solution, and thereafter maintaining the reaction mixture between 30° C.–100° C. under agitation until the condensation reaction has proceeded to the desired end-point.

10. Process of preparing a polyvinyl butyral resin by the condensation reaction of butyraldehyde with polyvinyl alcohol containing up to 30% of unhydrolyzed polyvinyl ester in a preponderantly water solution, which process comprises adding gradually with agitation in the presence of an acid catalyst to a quantity of said polyvinyl alcohol solution representing 10%–60% of the total polyvinyl alcohol to be reacted, said polyvinyl alcohol solution being of 5%–15% polyvinyl alcohol concentration, said butyraldehyde and the remainder of said polyvinyl alcohol solution, the commencement of the addition of said butyraldehyde and polyvinyl alcohol solution being substantially at the same time and said addition being substantially at a uniform rate in such relative proportions that at least 0.05 mol of aldehyde has been added to the reaction mixture by the time the addition of the polyvinyl alcohol solution is completed, and all of said butyraldehyde and polyvinyl alcohol solution being added to the reaction mixture in a period of 5 to 60 minutes, and said reaction mixture being maintained substantially constant between 55° C.–65° C. during the addition of said butyraldehyde and polyvinyl alcohol solution, and thereafter maintaining the reaction mixture between 30° C.–100° C. under agitation until the condensation reaction has proceeded to the desired end-point.

GELU STOEFF STAMATOFF.